United States Patent Office 3,700,666
Patented Oct. 24, 1972

3,700,666
TRIAZINE DERIVATIVES OF THIOBISPHENOLS
AND PROCESS OF PREPARATION
Michael Robin, Colonia, and Sheldon R. Schulte, Highland Park, N.J., assignors to Ashland Oil & Refining Company, Houston, Tex.
No Drawing. Filed Dec. 16, 1969, Ser. No. 885,633
Int. Cl. C07d 55/50
U.S. Cl. 260—248 CS                8 Claims

ABSTRACT OF THE DISCLOSURE

Reaction products of a triazine compound such as a cyanuric halide and a hindered thiobisphenol are obtained. Such products are useful as antioxidants and ultraviolet stabilizers in various compositions and materials.

BACKGROUND OF THE INVENTION

This invention relates to novel substituted triazines and a novel process of preparation. More particularly it relates to reaction products of triazine compounds and hindered thiobisphenols and a process of preparation.

Synethetic polymers such as polyethylene, rubber (natural and synthetic), waxes, oils, fats and numerous other compounds are attacked by oxygen and eventually may become useless for their intended purpose. The chemical reaction by means of which oxygen attacks and degrades the compounds is a free radical chain reaction. Free radicals are produced by abstraction of hydrogen atoms from the molecules of the compounds by light, heat, mechanical action, active molecules, etc.

The free radicals are extremely reactive in the presence of air and oxygen, forming peroxide radicals, which in turn abstract hydrogen atoms from the molecules to form additional radicals. These again react with oxygen in the same manner. Thus, once started, the reaction is a self-perpetuating, degradative, continuous chain reaction until stopped. In order to prevent such degradation, various antioxidants have been added which react with and destroy the intermediate chemical free radicals without producing equally reactive intermediates.

Various phenols such as 2,2'-thiobis-(6-tert.butyl-4-methylphenol) have been used as antioxidants; however, the prior antioxidants have the disadvantage of losing effectiveness at comparatively high temperatures, even when used in synergistic combinations. Continuing work is therefore being done to obtain compounds with improved antioxidative properties. We have found that the novel compounds of this invention surprisingly and unexpectedly exhibit increased stabilizing properties; and thereby the quantity necessary to achieve a desired level of stabilization at such temperatures as are normally used for molding, calendering, extrusion and other forming processes is reduced. Moreover, with the novel compounds of our invention, substantial degrees of stabilization can be attained at higher temperatures at which combinations of triazine compounds and separate thiobisphenolic compounds are substantially less effective.

The compounds of our invention in addition to being excellent antioxidants are also useful ultraviolet light stabilizers.

BRIEF DESCRIPTION OF THE INVENTION

The novel compounds of our invention are substituted triazines in which at least one of the carbon atoms in the triazine ring is connected to a hindered thiobisphenol through the oxygen remaining after the removal of the hydrogen of a phenolic hydroxyl group. The hindered thiobisphenol is a bisphenol with two phenolic rings bridged through a sulfur linkage and with at least one bulky hydrocarbon group of at least one carbon atom in a position ortho to the hydroxyl on each phenolic ring. Preferably, each of the carbon atoms in the triazine ring is connected to a hindered thiobisphenol, and more preferably each of two carbon atoms in the triazine ring is connected to a different phenolic ring in the same thiobisphenol molecule through an oxygen remaining after removal of a hydrogen of a phenolic hydroxyl group. "Different" is employed herein to indicate separate phenolic rings rather than those which differ in structure. The structure(s) of these rings may be alike or dissimilar.

The novel compounds of our invention may constitute, for instance, the reaction products from about one reacted mole of a triazine compound and at least about one reacted mole and preferably about three reacted moles and more preferably about two reacted moles of a hindered thiobisphenol. The hindered thiobisphenol is a bisphenol with the two phenolic rings bridged through a sulfur linkage and with at least one bulky hydrocarbon group of at least one carbon atom in a position ortho to the hydroxy group on each phenolic ring.

The reaction products may be formed by employing conventional conditions such as time, temperature and environment for forming derivatives of triazine compounds, but preferably are formed by our novel process which will be discussed hereinafter.

The compounds of the invention surprisingly and unexpectedly exhibit greatly superior antioxidation and ultraviolet light stabilization properties as compared to substituted triazines wherein the phenolic compound precursor contains only a single phenolic ring. The compounds of the invention also unexpectedly exhibit greatly improved stabilization properties as compared to substituted triazines wherein the thiobisphenolic compound precursor is not substituted in a position ortho to the hydroxyl group on each phenolic ring with a bulky hydrocarbon group of at least one carbon atom. Furthermore, compounds of the invention unexpectedly may stabilize as much as approximately ten times as effectively as the parent phenolic compounds from which they are obtained. Also compounds of the invention are about ten percent more effective as ultraviolet light stabilizers as compared to the parent phenolic compounds from which they are obtained.

When the novel compounds of the invention are obtained from fully hindered thiobisphenols such are quite unexpected since it is generally believed in the art that phenols which are fully hindered, virtually lose the reactivity of their hydroxyl group and cannot be converted to various derivatives by normal techniques. For example, this non-reactivity of hindered phenols is discussed in Kirk and Othmer, Encyclopedia of Chemical Technology, vol. 1, pages 902 and 906. Indeed it is quite surprising and unexpected that when fully hindered phenols are used herein they react with the triazine compounds under normal conditions for forming triazine derivatives. A fully hindered thiobisphenol for the purposes of this application is intended to mean that all positions ortho and para to the hydroxyl group on each ring of the bisphenol are substituted.

Briefly, the process aspect of the invention includes the reacting of the triazine compound and the hindered thiobisphenol in methyl ethyl ketone and/or diethyl ketone as a diluent.

DESCRIPTION OF THE PREFERRED EMBODIMENTS

The triazine compounds used in preparing the compounds of the invention can be any of the triazine compounds having reactive groups. Examples of such compounds are the halide substituted triazines. The preferred triazine compounds are the trihalide triazines, such as the chlorides, bromides, and iodides. Examples of some suitable halide triazines are 2,4,6-trichloro-1,3,5-triazine (cyanuric chloride); 2,4,6-triiodo-1,3,5-triazine (cyanuric iodide); 2,4,6-tribromo-1,3,5-triazine (cyanuric bromide); 2,4,6-trifluoro-1,3,5-triazine (cyanuric fluoride); 2-chloro-4,6-dihydroxy-1,3,5-triazine; 2 - chloro-4,6-difluoro-1,3,5-triazine; 2-fluoro-4,6-dichloro-1,3,5-triazine; and 2-chloro 4,6-diiodo-1,3,5-triazine. The most preferred compound is 2,4,6 trichloro-1,3,5 triazine (cyanuric chloride).

Thiobisphenol compounds are represented by the following formula:

(I)

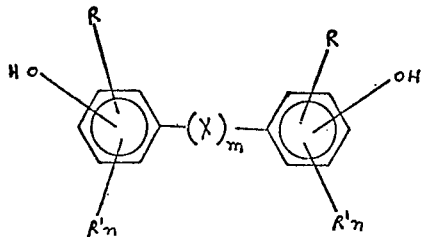

The X is a sulfur linkage, and can for example be —S—,

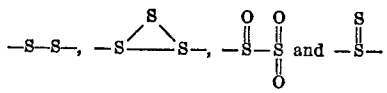

and preferably is S.

The $m$ is a whole number integer of at least one, and preferably is 1–3, and most preferably is 1.

The OH group on each ring can be in any position but preferably is either ortho or para to the sulfur linkage, and is most preferably in the ortho position.

Each R individually is a bulky hydrocarbon group of at least one carbon atom and is ortho to the OH group on each ring. Usually the bulky hydrocarbon group is free of non-benzenoid unsaturation. R is preferably a bulky hydrocarbon group of from 1–22 carbon atoms such as methyl, ethyl, t-butyl, t-amyl, t-hexyl, cyclohexyl, t-pentyl, t-octyl, phenyl, naphthyl, α-methylcyclohexyl, nonyl, benzyl, menthyl, isobornyl, phenanthryl, anthranyl, norbornyl, cyclopropyl, cyclopentyl, bicyclohexyl, cyclobutyl, 1,2-dimethylcyclopropyl and xylyl. More preferably R is a bulky hydrocarbon of from 1–12 carbon atoms. It is especially preferred that the bulky hydrocarbon group is an alkyl group. This applies to the preferred carbon atom range of 1–22 as well as to the more preferred carbon atom range of 1–12. The most preferred bulky hydrocarbon group is t-butyl.

Each R' individually is any substituent which can be attached to the ring. R' advantageously is, but is not limited to: a hydrocarbon group such as the hydrocarbon groups set forth above for R; or a halide group such as chlorine or bromine; or —NO₂; or —SR'''; or —OR''; or —COOR''; or —NR''; or —NHR'''NH₂; or —NHOH; or —NHR''' OH; wherein R'' is H or a hydrocarbon group as defined above for R, and R''' is an alkylene group of 1–22 carbon atoms and preferably of 1–12 carbon atoms. Some specific —SR''' groups are —SH; —SCH₃; —SC₂H₅; —SC₉H₁₉; —SC₆H₅; and —SC₆H₁₁.

Some specific —OR'' groups are —OH; —OC₆H₅; —OC₆H₁₁; —OCH₃; OC₂H₅; and —OC₉H₁₉.

Some specific —COOR'' groups are —COOH; —COOC₂H₅; —COOC₉H₁₉; —COOC₆H₅; —COOC₆H₁₁; and —COOCH₃.

Some specific —NR''R'' groups are —NH₂; —NHCH₃; —N(CH₃)₂;

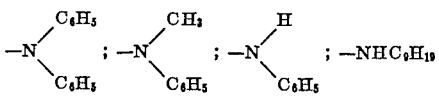

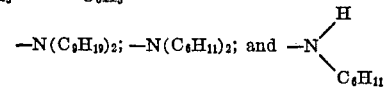

Some specific —NHR'''NH₂ groups are —NHCH₂NH₂; —NHC₂H₄NH₂; —NHC₉H₁₈NH₂; and —NHC₆H₁₂NH₂.

Some specific —NHR'''OH groups are —NHCH₂OH; —NHC₂H₄OH; —NHC₉H₁₈OH; and —NHC₆H₁₂OH.

R' preferably is an alkyl group containing at least one carbon atom with methyl being the most preferred. Usually alkyl groups of not more than 22 carbon atoms are employed. Advantageously, the alkyl group contains 1–12 carbon atoms.

$n$ is a whole number integer from 0 to 3 and is preferably 1.

Specific examples of suitable thiobisphenols are:

2,2'-thiobis(4,6-ditert-butylphenol);
2,2'-dithiobis-(4,6-ditert-butylphenol);
2,2'-thiobis-(6-tert.butyl-4-methylphenol);
2,2'-thiobis-(4-methyl-6-nonylphenol);
4,4'-thiobis-(5-tert.butyl-2-methylphenol);
4,4'-thiobis-(6-tert.-butyl-3-methylphenol);
bis-(3-tert.-butyl-2-hydroxy-5-methyl)sulfone;
bis-(3-tert.butyl-2-hydroxy-5-methyl)sulfoxide;
2,2'-dithiobis-(4-methyl-6-nonylphenol); and
2,2'-trithiobis-(4,6-ditert-butylphenol).

The most preferred hindered thiobisphenol is 2,2'-thiobis (6-tert-butyl-4-methylphenol).

The diluent can be any liquid, provided it is inert (not reactive in any manner which will harm the reaction or the product) and will dissolve at least one of the reactants. Examples of suitable diluents are methylene chloride, dichloroethane, tetrachloroethane, trichloroethylene, dichlorobenzene, carbon disulfide, nitrobenzene and certain ketones such as acetone, methyl ethyl ketone, methyl isobutyl ketone, dibutyl ketone, and diethyl ketone.

Unexpectedly, we have found that an improved process is achieved when using methyl ethyl ketone and/or diethyl ketone as the diluent as compared with other similar diluents.

It was surprisingly discovered that when using as reaction diluents, compounds other than methyl ethyl ketone and diethyl ketone it was necessary to employ at least one purification, such as recrystallization, in addition to the initial isolation step, and washings, if any, to obtain a product of comparable purity. The separation of the desired product when the methyl ethyl ketone and/or diethyl ketone is the diluent can be readily accomplished by either mere filtration, or by separating a ketone containing organic layer from an aqueous layer, and then evaporating the ketone. Of course, for extremely pure products it may be desirable to employ one or more washing steps.

It can readily be appreciated that such a reduction in process steps is a great advantage. The use of methyl ethyl ketone and/or diethyl ketone reduces the time and expense of obtaining the final desired product. The minimum amount of diluent is usually about 0.5 part by weight per part of reactants. The maximum amount of diluent is only limited by practical considerations such as economics and equipment capacities. Usually amounts of about 10 parts by weight per part of reactants are more than sufficient. Preferably the amount of diluent is between about 0.5 part and about 1.5 parts per part of reactants. The most preferred amount of diluent is about 1.0 part of diluent per part of reactants.

The process is not limited to specific reaction temperatures, since the reaction can be carried out over a wide range of temperatures. For example, the process can be carried out at temperatures of from about 0° C. to temperatures of about 250° C. The preferred temperature range varies from about 15° C. to about 100° C., and the most preferred temperature range is between about 15° and 75° C. Also the process is not limited to any specific reaction time, since the time required will vary, primarily dependent upon the particular reactants, temperatures, and reaction environment. Preferably the reaction time varies from about 1 to about 6 hours. About 4 hours is the reaction time which is most commonly used.

Atmospheric pressure is the most commonly used pressure for carrying out the invention. Of course, higher or lower pressures can be employed when desired.

Usually the reaction is conducted under alkaline and, in particular, caustic conditions. It is understood that it is not necessary to employ caustic conditions, particularly when temperatures at the upper end of the disclosed range are used.

Some of the novel triazine compounds of the invention are illustrated by the following structures:

(II)

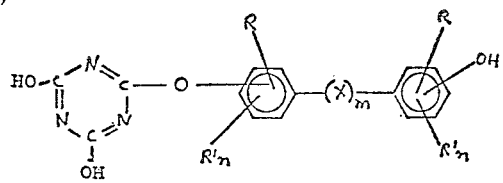

(III)

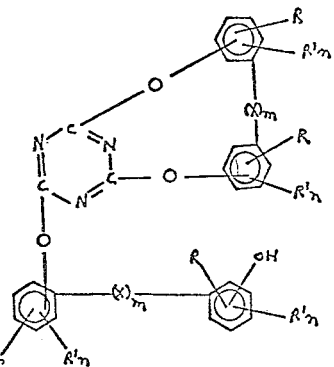

(IV)

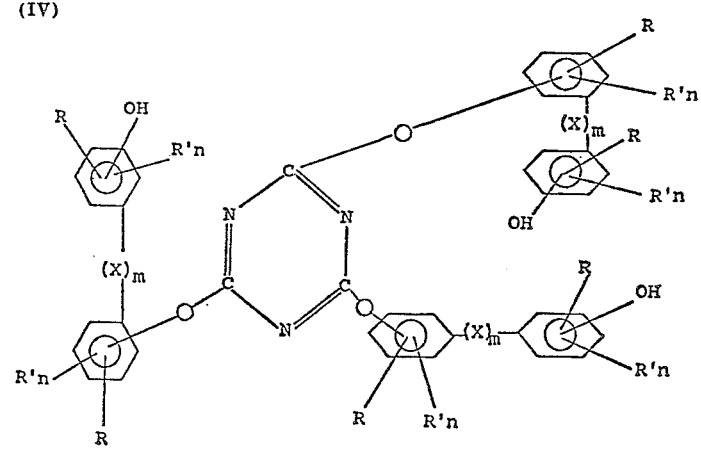

(V)

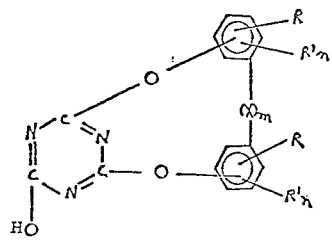

(VI)

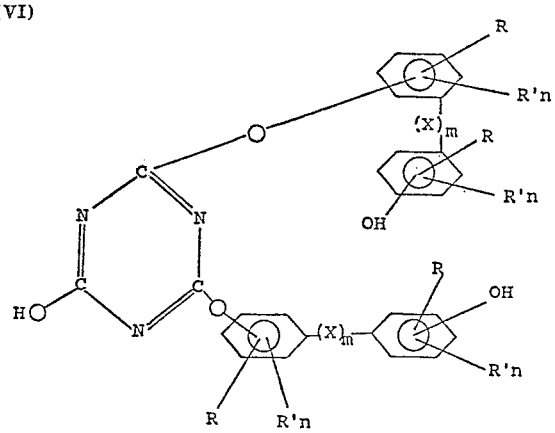

wherein X, R', R, $n$ and $m$ have the same definitions and positions set forth in respect to Formula I.

The triazine derivatives of our invention are useful as antioxidants and ultraviolet stabilizers in a wide variety of materials. Among such materials are synthetic polymers, rubber (natural and synthetic), waxes, fats and oils. Among the synthetic polymers which can be stabilized with the products of this invention are polyolefins such as polyethylene, polypropylene and polybutene; diene rubbers such as polyisoprene, polybutadiene, copolymers of conjugated dienes and at least one other copolymerizable monomer such as styrene, acrylonitrile, methyl acrylate, and 2-vinyl pyridine; polystyrene, polyacrylates; vinyl chloride polymers; polyesters; epoxies; polyacetals; polyurethanes and others. The products of this invention are most effective when added to polyolefins, e.g. polypropylene and polyethylene. The amount of antioxidant needed to stabilize a particular material can obviously be varied over a wide range of proportions dependent upon the specific material, the desired degree of stabilization, and the environment in which the material is to be used. An amount of about 0.1% by weight based upon the material to be stabilized is very effective. The threshold at which the compounds of our invention are effective is about 0.001% by weight based upon the combined weight of material to be stabilized. The compounds of our invention are used in amounts as high as 5% by weight or higher based upon the weight and material to be stabilized.

In order that the invention may be better understood, the following non-limiting examples are given, in which all parts are by weight unless the contrary is clearly indicated. As will be seen from the examples, the compounds of this invention are superior to the prior art antioxidants.

EXAMPLE 1

To a mixture of one mole of cyanuric chloride (2,4,6-trichloro-1,3,5-triazine) dissolved in 2000 parts of acetone, at ambient or room temperature are added all at once and with agitation, 2 moles of 2,2'-thiobis(6-tert-butyl-4-methylphenol) while maintaining the temperature of the mixture at about room temperature. Two moles of a 25% aqueous caustic soda solution are then slowly added with agitation over approximately one hour. The reaction mixture is then agitated at room temperature for one hour. While stirring, the mixture is heated at 60° C. for 30 minutes, at which time 1000 parts of water are added. The mixture is heated while stirring at 70° C. for one hour, and then cooled to ambient temperature. The reaction product is isolated from the reaction medium by filtration, washing with acetone and then with water, and then recrystallizing from benzene. The product is a white solid melting at 193–196° C. and has the following structure as determined by elemental analysis, nuclear magnetic resonance (NMR) and IR Spectra:

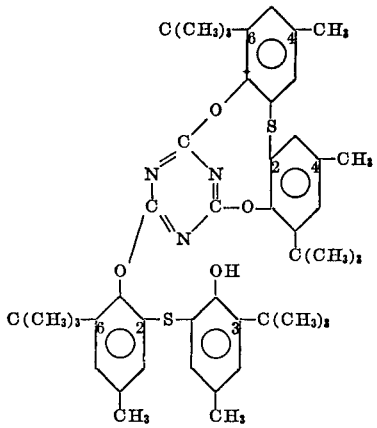

2-[2-(2-hydroxy-3-tert-butyl - 5 - methyl-phenylthio)-4-methyl-6-tert-butylphenoxy] - 4,6 - [2,2'-thiobis-(4-methyl-6-tert-butylphenoxy)]-s-triazine.

EXAMPLE 2

To a mixture of one mole of cyanuric chloride (2,4,6-trichloro-1,3,5-triazine) dissolved in 2000 parts of methyl ethyl ketone, at ambient or room temperature, are added all at once and with agitation 2 moles of 2,2'-thiobis (6-tert-butyl-4-methylphenol) while maintaining the temperature of the mixture at about room temperature. Two moles of a 25% aqueous caustic soda solution are then slowly added with agitation over approximately one hour. The reaction mixture is then agitated at room temperature for one hour. While stirring, the mixture is heated at 60° C. for 30 minutes, at which time 1000 parts of water are added. The mixture is heated while stirring at 70° C. for one hour, and then cooled to ambient temperature. The reaction product is isolated from the reaction medium by filtration, washing with methyl ethyl ketone and then with water. The product is a white solid melting at 193–196° C. and has the same structure as Example 1 as determined by elemental analysis, nuclear magnetic resonance (NMR) and IR Spectra.

EXAMPLE 3

To a mixture of one mole of cyanuric chloride (2,4,6-trichloro-1,3,5-triazine) dissolved in 2000 parts of methyl ethyl ketone, at ambient or room temperature, are added all at once and with agitation, 2 moles of 2,2' thiobis (4,6-ditertbutylphenol) while maintaining the temperature of the mixture at about room temperature. Two moles of a 25% aqueous caustic soda solution are then slowly added with agitation over approximately one hour. The reaction mixture is then agitated at room temperature for one hour. While stirring, the mixture is heated at 60° C. for 30 minutes, at which time 1000 parts of water are added. The mixture is heated while stirring at 70° C. for one hour, and then cooled to ambient temperature. The reaction product is isolated from the reaction medium by filtration, washing with methyl ethyl ketone and with water. The product is a white solid melting at 219–224° C. and has the following structure as determined by elemental analysis and IR Spectra:

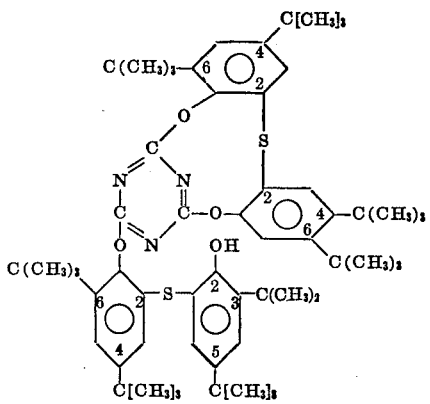

2-[2-(2-hydroxy-3,5-di-tert-butyl phenylthio)-4,6-di-tert-butylphenoxy] - 4,6 - [2,2' - thiobis-(4,6-di-tert-butylphenoxy)]-s-triazine.

EXAMPLE 4

To a mixture of one mole of cyanuric chloride (2,4,6-trichloro-1,3,5-triazine) dissolved in 2000 parts of methyl ethyl ketone, at ambient temperature, are added all at once and with agitation 3 moles of 2,2'-dithiobis-(6-tert-butyl-4-methylphenol) while maintaining the temperature of the mixture at about room temperature. Three moles of a 25% aqueous caustic soda solution are then slowly added with agitation over approximately one hour. The reaction mixture is then agitated at room temperature for one hour. While stirring, the mixture is heated at 60° C. for 30 minutes, at which time 1000 parts of water are added. The mixture is heated while stirring at 70° C. for one hour, and then cooled to ambient temperature. The reaction mass then forms two layers, the upper being a methyl ethyl ketone layer and the lower being an aqueous layer. The product is isolated from the reaction medium by separating the methyl ethyl ketone layer from the aqueous layer, washing with water, separating again and evaporating off the liquids. The product is a white solid melting at 102.5–114° C. and has the following structure as determined by elemental analysis, and IR Spectra:

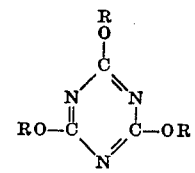

wherein each R is:

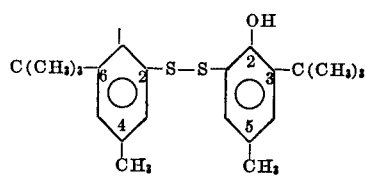

2,4,6 - tris[2 - (2-hydroxy-3-tert-butyl-5-methylphenyldithio)-4-methyl-6-tert-butylphenyl] cyanurate.

EXAMPLE 5

To a mixture of one mole of cyanuric chloride (2,4,6-trichloro-1,3,5-triazine) dissolved in 2000 parts of methyl ethyl ketone, at ambient temperature, are added all at once and with agitation 3 moles of 2,2′ thiobis-(4-methyl-6-nonylphenol) while maintaining the temperature of the mixture at about room temperature. Three moles of a 25% aqueous caustic soda solution are then slowly added with agitation over approximately one hour. The reaction mixture is then agitated at room temperature for one hour. While stirring, the mixture is heated at 60° C. for 30 minutes, at which time 1000 parts of water are added. The mixture is heated while stirring at 70° C. for one hour, and then cooled to ambient temperature. The reaction mass then forms two layers, the upper being a methyl ethyl ketone layer and the lower being an aqueous layer. The product is isolated from the reaction medium by separating the methyl ethyl ketone layer from the aqueous layer, washing with water, separating again and evaporating off the liquids. The product is a white solid melting at 67–80° C. and has the following structure as determined by elemental analysis and IR Spectra:

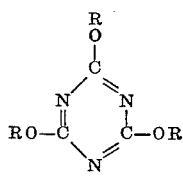

wherein each R is:

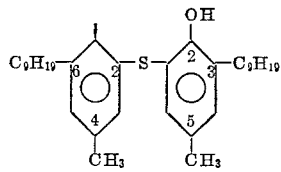

2,4,6 - tris[2-(2-hydroxy-3-nonyl-5-methyl-phenylthio)-4-methyl-6-nonylphenyl] cyanurate.

EXAMPLE 6

To a mixture of one mole of cyanuric chloride (2,4,6-trichloro-1,3,5-triazine) dissolved in 2000 parts of methyl ethyl ketone, at ambient temperature, are added all at once and with agitation 3 moles of 2,2′-trithiobis-(4,6-di-tert-butylphenol) while maintaining the temperature of the mixture at about room temperature. Three moles of a 25% aqueous caustic soda solution are then slowly added with agitation over approximately one hour. The reaction mixture is then agitated at room temperature for one hour. While stirring, the mixture is heated at 60° C. for 30 minutes, at which time 1000 parts of water are added. The mixture is heated while stirring at 70° C. for one hour, and then cooled to ambient temperature. The reaction product is isolated from the reaction medium by filtration, and washing with methyl ethyl ketone and then with water. The product is a white solid melting above 260° C. and has the following structure as determined by elemental analysis and IR Spectra:

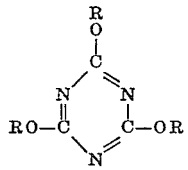

wherein each R is:

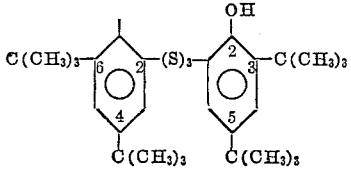

2,4,6 - tris[2,-(2-hydroxy-3,5-di-tert-butyl-phenyltrithio)-4,6-di-tert-butylphenyl] cyanurate.

The following Examples 7 to 14 are presented to demonstrate the improved process when employing methyl ethyl ketone and/or diethyl ketone as the diluent.

EXAMPLE 7

To a mixture of 0.2 mole of cyanuric chloride (2,4,6-trichloro-1,3,5-triazine) dissolved in 200 parts of methyl ethyl ketone, at ambient or room temperature, are added all at once and with agitation, 0.4 mole of 2,2′ thiobis (6-tert-butyl-4-methylphenol) while maintaining the temperature of the mixture at about room temperature. 0.4 mole of a 25.63% aqueous caustic soda solution are then slowly added with agitation over approximately one hour. The reaction mixture is then agitated at room temperature for one hour. While stirring, the mixture is heated at 60° C. for 30 minutes; at which time 100 parts of water are added. The mixture is heated while stirring at 70° C. for one hour, and then cooled to ambient temperature. The reaction product is isolated from the reaction medium by filtration, washing with methyl ethyl ketone and then washing with water. 84% of the theoretical yield of product is obtained. The product is a white solid melting at 192–196° C. and has the following structure as determined by elmental analysis and IR Spectra:

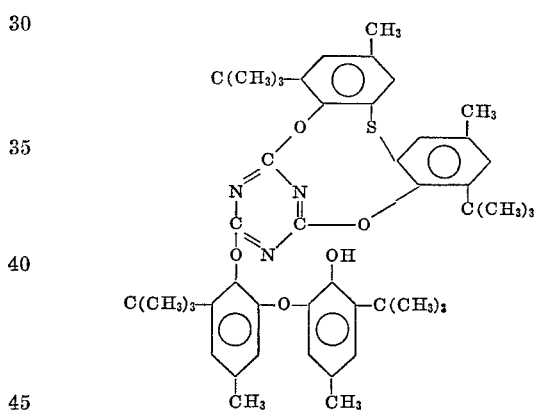

EXAMPLE 8

To a mixture of 0.2 mole of cyanuric chloride (2,4,6-trichloro-1,3,5-triazine) dissolved in 200 parts of diethyl ketone, at ambient temperature, are added all at once and with agitation 0.4 mole of 2,2′ thiobis (6-tert-butyl-4-methylphenol) while maintaining the tempertaure of the mixture at about room temperature. 0.3 mole of a 25.63% aqueous caustic soda solution are then slowly added with agitation over approximately one hour. The reaction mixture is then agitated at room temperature for one hour. While stirring, the mixture is heated at 60° C. for 30 minutes, at which time 100 parts of water are added. The mixture is heated while stirring at 70° C. for one hour, and then cooled to ambient temperature. The reaction product is isolated from the reaction medium by filtration, washing with diethyl ketone and then washing with water. Above 80% of the theoretical yield of product is obtained. The product is a white solid melting at 192–196° C. and has the same structure as set forth in Example 7 as determined by elemental analysis and IR Spectra.

EXAMPLE 9

To a mixture of 0.2 mole of cyanuric chloride (2,4,6-trichloro-1,3,5-triazine) dissolved in 200 parts of methylisobutyl ketone, at ambient or room temperature, are added all at once and with agitation, 0.4 mole of 2,2′ thiobis (tert-butyl-4-methylphenol) while maintaining the temperature of the mixture at about room temperature. Two moles of a 25.63% aqueous caustic soda solution are then slowly added with agitation over approximately one hour. The reaction mixture is then agitated at room temperature for one hour. While stirring, the mixture is heated at 60° C. for 30 minutes, at which time 100 parts of water are added. The mixture is heated while stirring at 70° C. for one hour, and then cooled to ambient temperature. The reaction product is isolated from the reaction medium by filtration, washing with methylisobutyl ketone and then washing with water. Only 32% of the theoretical yield of product is obtained by this procedure. The product is a white solid melting at 190–196° C. and has the same structure as set forth in Example 7 as determined by elemental analysis and IR Spectra.

EXAMPLE 10

To a mixture of 0.15 mole of cyanuric chloride (2,4,6-1,3,5-triazine) dissolved in 150 parts of cyclohexanone, at ambient or room temperature, are added all at once and with agitation, 0.3 mole of 2,2′ thiobis (6-tert-butyl-4-methylphenol) while maintaining the temperature of the mixture at about 27° C. 0.3 mole of a 24.41% aqueous caustic soda solution are then slowly added with agitation over approximately one hour. The reaction mixture is then agitated at about 27° C. for one hour. While stirring, the mixture is heated at 60° C. for 30 minutes, at which time 75 parts of water are added. The mixture is heated while stirring at 70° C. for one hour, and then cooled to ambient temperature. The reaction product is isolated from the reaction medium by filtration, washing with cyclohexanone and then with water. Only about 12.6% of the theoretical yield of product is obtained by this procedure. The product is a white solid melting at 185–195° C. and has the same structure as set forth in Example 7 as determined by elemental analysis and IR Spectra.

EXAMPLE 11

To a mixture of 0.15 mole of cyanuric chloride (2,4,6-trichloro-1,3,5-triazine) dissolved in 150 parts of dimethylformamide, at ambient or room temperature, are added all at once and with agitation 0.3 mole of 2,2′-thiobis-(6-tert-butyl-4-methylphenyl) while maintaining the temperature of the mixture at about 40° C. 0.3 mole of a 24.41% aqueous caustic soda solution are then added slowly with agitation over approximately one hour. The reaction mixture is then agitated at about 40° C. for one hour. While stirring, the mixture is heated at 60° C. for 30 minutes, at which time 75 parts of water are added. The mixture is heated while stirring at 70° C. for one hour, and then cooled to ambient temperature. Only a gummy solid mixture is isolated from the reaction medium by filtration, washing with dimethylformamide and then washing with water.

EXAMPLE 12

To a mixture of 0.15 mole of cyanuric chloride (2,4,6-trichloro-1,3,5-triazine) dissolved in 150 parts of methyl ethyl ketone, at ambient or room temperature, are added all at once and with agitation 0.3 mole of 2,2′-thiobis (6-tert-butyl-4-methylphenol) while maintaining the temperature of the mixture at about 45° C. 0.3 mole of a 24.41% aqueous caustic soda solution are then slowly added with agitation over approximately one hour. The reaction mixture is then agitated at about 45° C. for one hour. While stirring, the mixture is heated at 60° C. for 30 minutes, at which time 75 parts of water are added. The mixture is heated while stirring at 70° C. for one hour, and then cooled to ambient temperature. The reaction product is isolated from the reaction medium by filtration, washing with methyl ethyl ektone and then with water. 82% of the theoretical yield of product is obtained. The product is a white solid melting at 194–198° C. and has the same structure as set forth in Example 7 as determined by elemental analysis and IR Spectra.

EXAMPLE 13

To a mixture of 0.1 mole of cyanuric chloride (2,4,6-trichloro-1,3,5-triazine) dissolved in 100 parts of methyl ethyl ketone, at ambient or room temperature, are added all at once and with agitation 0.2 mole of 2,2′ thiobis (6-tert-butyl-4-methylphenol) while maintaining the temperature of the mixture at about 27° C. 0.2 mole of a 24.41% aqueous caustic soda solution are then slowly added with agitation over approximately one hour. The reaction mixture is then agitated at about 27° C. for one hour. While stirring, the mixture is heated at 60° C. for 30 minutes, at which time 50 parts of water are added. The mixture is heated while stirring at 70° C. for one hour, and then cooled to ambient temperature. The reaction product is isolated from the reaction medium by filtration, washing with methyl ethyl ketone and then with water, 92% of the theoretical yield of product is obtained. The product is a white solid melting at 193–196° C. and has the same structure as set forth in Example 7 as determined by elemental analysis and IR Spectra.

EXAMPLE 14

To a mixture of 0.45 mole of cyanuric chloride (2,4,6-trichloro-1,3,5-triazine) dissolved in 450 parts of methyl ethyl ketone, at ambient or room temperature, are added all at once and with agitation 0.9 mole of 2,2′ thiobis (6-tert-butyl-4-methylphenol) while maintaining the temperature of the mixture at about 27° C. 0.9 mole of a 24.41% aqueous caustic soda solution are then slowly added with agitation over approximately one hour. The reaction mixture is then agitated at about 27° C. for one hour. While stirring, the mixture is heated at 60° C. for 30 minutes, at which time 1000 parts of water are added. The mixture is heated while stirring at 70° C. for one hour, and then cooled to ambient temperature. The reaction product is isolated from the reaction medium by filtration, washing with methyl ethyl ketone and then with water. 95% of the theoretical yield of product is obtained. The product is a white solid melting at 194–197° C. and has the same structure as set forth in Example 7 as determined by elemental analysis and IR Spectra.

It is readily apparent from the preceding examples that the use of methyl ethyl ketone and/or diethyl ketone as the diluent truly gives an improved process which is quite unexpected, since only when the diluent was methyl ethyl ketone and/or diethyl ketone was the desired product obtained from the reaction medium by mere filtration in a high enough yield to be economically feasible and practical. When using the indicated diluents, yields in amounts above 80% and as much as 95% are obtained as compared to yields of less than 33% with other diluents.

EXAMPLE A

The product of Example 1 is admixed with a polyethylene of 0.96 density and 300,000 molecular weight in a steel container and the mixture is extruded twice at 300° F. The concentration of the product of Example 1 is then adjusted to 0.1% by weight of the polymer by the addition of more of the polyethylene and the mixture is again extruded twice at 300° F. The resulting polyethylene composition is then pressed into a 6–6.5 mil film at 310° F. and 1280 p.s.i. on a 10″ hydraulic ram press. Likewise a film of the same polyethylene without any antioxidant and films of the same polyethylene containing 0.1% of some other antioxidants are prepared by the method set forth above. The resulting films are then subjected to 125°±1° C. in a forced draft oven. The absorbance in the carbonyl region, 5.8 microns of the IR Spectrum is then recorded after periods of exposure. When absorbance reaches 94% the sample is considered to be "oxidized,"

and the time of exposure to reach this point is recorded in the table below:

| Additive | Amount, percent | Time in hours to reach 94% absorbance |
|---|---|---|
| None | | 50 |
| 2,2'-thiobis-(4-methyl-6-tert.-butylphenol) | 0.1 | 120 |
| Reaction product of Example 2 | 0.1 | 1,095 |
| 2,2'-dithiobis-(6-tert-butyl-4-methylphenol) | 0.1 | 45 |
| Reaction product of Example 4 | 0.1 | 315 |

EXAMPLE B

The product of Example 1 is admixed with a polypropylene of 0.90 density and approximately 325,000 molecular weight in a steel container and the mixture is extruded twice at 380° F. The resulting polypropylene compositions containing 0.5% by weight of product of Example 1 are then pressed into a 6–6.5 mil film at 350° F. and 1280 p.s.i. on a 10" hydraulic ram press. Likewise a film of the same polypropylene without any antioxidant and a film of the same polypropylene containing 0.5% of 2,2'-thiobis-(6-t-butyl-4-methylphenol) are prepared by the method set forth above. The resulting three films are then subjected to 150°±1° C. in a forced draft oven. The absorbance in the carbonyl region, 5.8 microns, of the IR Spectrum is then recorded after periods of exposure. When absorbance is equal to 94% the sample is considered to be "oxidized," and the time of exposure to reach this point is recorded.

| Additive | Amount, percent | Time in hours to reach 94% absorbance |
|---|---|---|
| None | | 2 |
| 2,2' thiobis-(4-methyl-6-tert.-butylphenol) | 0.1 | 6 |
| Reaction product of Example 2 | 0.1 | 23 |

What is claimed is:
1. A thiobisphenol substituted triazine of the formula:

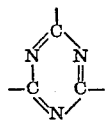

wherein the dangling valences on the foregoing triazine nucleus are satisfied by a hydroxyl group or a hindered thiobisphenol moiety of the character:

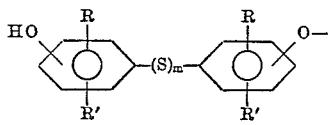

wherein each R is independently selected from alkyls of 1–12 carbon atoms and which is ortho to the OH group on each ring, wherein each R' is independently selected from alkyls of 1–12 carbon atoms and which is ortho or para to the OH group on each ring, and m is an integer of 1–3, and wherein two valences of said triazine nucleus can be satisfied by the same hindered thiobisphenol moiety linked to the triazine nucleus through different oxygens after removal of hydrogen, with the proviso that at least one of the three valences on said triazine nucleus must be satisfied by a hindered thiobisphenol substituent.

2. A substituted triazine according to claim 1 and of the formula:

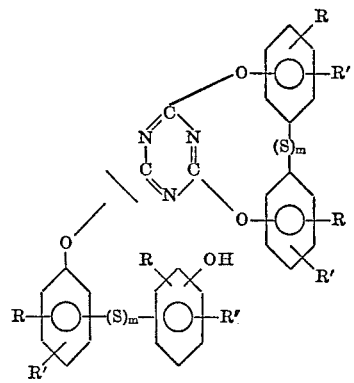

wherein R is independently selected from alkyls of 1–12 carbon atoms and which is ortho to the OH group on each ring, wherein R' is independently selected from alkyls of 1–12 carbon atoms and which is ortho or para to the OH group on each ring, and m is an integer of 1–3.

3. A substituted triazine according to claim 2 wherein m is 1.

4. A substituted triazine according to claim 3 wherein the OH groups on each ring is ortho to the sulfur linkage.

5. A substituted triazine according to claim 4 wherein R' is in the para position to the OH group on each ring.

6. A thiobisphenol substituted triazine according to claim 1 which is 2-[2-(2-hydroxy-3-tert-butyl-5-methylphenylthio) - 4 - methyl - 6 - tert-butylphenoxy]-4,6-[2,2'-thiobis-(4-methyl-6-tert-butyl-phenoxy)]-s-triazine.

7. The substituted triazine which is 2-[-2-(2-hydroxy-3-tert.-butyl - 5 - methyl-phenylthio)-4-methyl - 6 - tert.-butylphenoxy]-4,6-[2,2'-thiobis-(4-methyl - 6 - tert.-butylphenoxy)]-s-triazine.

8. The substituted triazine which is 2-[-(2-hydroxy-3,5-di-tert.-butyl-phenylthio)-4,6-di-tert.-butylphenoxy] - 4,6-[2,2'-thiobis-(4,6-di-tert.-butylphenoxy)]-s-triazine.

References Cited
UNITED STATES PATENTS

| 3,250,772 | 5/1966 | Dexter et al. | 260—248 |
| 3,316,263 | 4/1967 | Ross et al. | 260—248 |
| 3,454,551 | 7/1969 | Mangini et al. | 260—248 X |

JOHN M. FORD, Primary Examiner

U.S. Cl. X.R.

252—401, 300, 45.8 N